Figure 1:
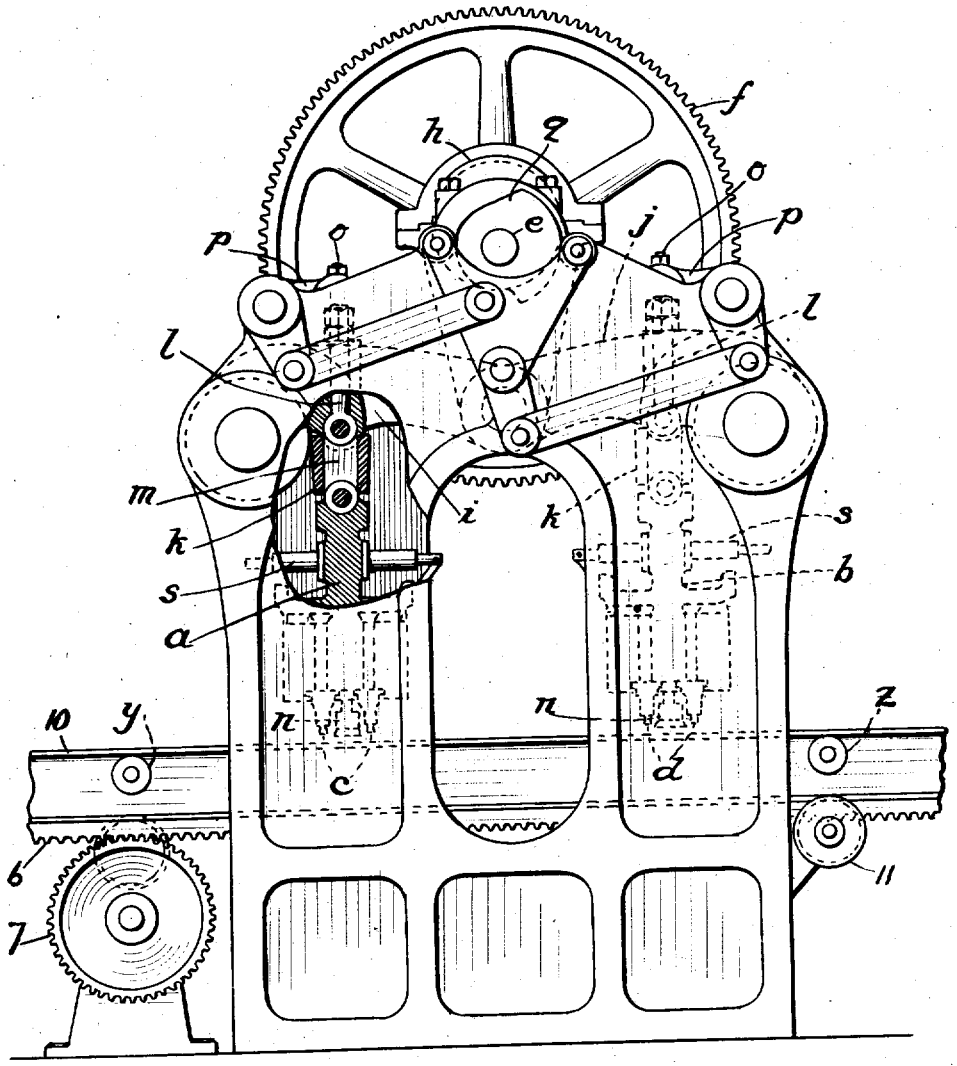

L. H. VOLD.

MULTIPLE PUNCH.

APPLICATION FILED MAR. 9, 1912.

Reissued Oct. 1, 1912.

13,472.

5 SHEETS—SHEET 1.

WITNESSES:

Robt. R. Kitchel

M. M. Hamilton

INVENTOR

Lars H. Vold

BY Frank S. Busser

ATTORNEY.

NORRIS PETERS, INC., LITHO., WASHINGTON, D. C.

L. H. VOLD.

MULTIPLE PUNCH.

APPLICATION FILED MAR. 9, 1912.

Reissued Oct. 1, 1912.

13,472.

5 SHEETS—SHEET 2.

WITNESSES.

Robt. R. Kitchel.

M. M. Hamilton

INVENTOR

Lars H. Vold

BY

Frank S. Busser

ATTORNEY.

L. H. VOLD.

MULTIPLE PUNCH.

APPLICATION FILED MAR. 9, 1912.

Reissued Oct. 1, 1912.

13,472.

5 SHEETS—SHEET 3.

WITNESSES:

Robt. R. Ritchel.

M. M. Hamilton

INVENTOR

Lars H. Vold

BY Frank S. Busser

ATTORNEY.

NORRIS PETERS, INC., LITHO., WASHINGTON, D. C.

L. H. VOLD.

MULTIPLE PUNCH.

APPLICATION FILED MAR. 9, 1912.

Reissued Oct. 1, 1912.

13,472.

5 SHEETS—SHEET 4.

WITNESSES:

Robt. R. Kitchel

M. M. Hewitt

INVENTOR

Lars H. Vold

BY Frank S. Busser

ATTORNEY.

L. H. VOLD.

MULTIPLE PUNCH.

APPLICATION FILED MAR. 9, 1912.

Reissued Oct. 1, 1912.

13,472.

6 SHEETS—SHEET 5.

WITNESSES:

Robt. R. Ritchel.

W. M. Hamilton

INVENTOR

Lars H. Vold

BY Frank S. Busser

ATTORNEY.

MORRIS PETERS, INC., LITHO., WASHINGTON, D. C.

UNITED STATES PATENT OFFICE.

LARS H. VOLD, OF WESTVILLE, NEW JERSEY, ASSIGNOR TO WILLIAM SELLERS & COMPANY, INCORPORATED, OF PHILADELPHIA, PENNSYLVANIA, A CORPORATION OF PENNSYLVANIA.

MULTIPLE PUNCH.

13,472. Specification of Reissued Letters Patent. Reissued Oct. 1, 1912.

Original No. 1,016,459, dated February 6, 1912, Serial No. 634,272. Application for reissue filed March 9, 1912. Serial No. 682,828.

*To all whom it may concern:*

Be it known that I, LARS H. VOLD, a citizen of the United States, residing at Westville, county of Gloucester, State of New Jersey, have invented a new and useful Improvement in Multiple Punches, of which the following is a full, clear, and exact description, reference being had to the accompanying drawings, which form a part of this specification.

In Letters Patent No. 833,811, issued to me October 23, 1906, is described and illustrated a multiple punching machine. In the machine of that patent a single punching bar is used, and while the punches are adjustable with respect to each other, upon that punching bar, such machine has considerable limitations, both as to the character of holes capable of being punched and the longitudinal alinement of the arrangement of holes.

It is essential, for practical reasons, that the punch holders shall be considerably wider than the diameter of the punches, thus for one inch punches it has been found impracticable to make the punch holders less than two and one quarter inches wide. The width of the punch holder, therefore limits the distance between any two adjacent holes in the line transverse to the movement of the work. It is not practicable to move punches laterally between successive punchings, and no two punches in the same row can be set closer together than the minimum, say two and one-quarter inches; therefore other provision must be made for punching holes closer together transversely than the minimum allowed by the punch holders. Speaking generally, I accomplish this result by using a plurality of rows of punches carried on one or more punching bars. With two punching bars, each carrying two rows of adjustable punches, I have a possibility of four adjustments less than the minimum distance between any two punches in one row, or I can use punches of different diameters, even if they fall on the same longitudinal line with the other holes not of the same diameter. Moreover, each set of punches may be of different construction or size.

As is the case with the single punch bar of my Patent No. 833,811, so with the plurality of punch bars of the machine now under consideration, said punch bars are simultaneously reciprocated to and from the plate and the coacting dies, and when moved from the plate, the work or plate is moved forward. As in my previous patent, each individual punch is controlled by a gag block operated by pneumatic means, which in turn is controlled by a perforated paper roll. For example, the space between sets of punches, on the same bar, may be about six inches.

Where a number of holes are to be made by punches in different sets or rows, it is necessary that the various punches shall be rendered operative at the moment when the proper point on the advancing plate shall be directly under the proper row of punches, and the perforated templet must be so prepared as to accomplish this result. For instance, if a punch in a given row is to punch a hole and another hole in the same line is to be punched by a punch of another row of punches, separated from the first row of punches, by, say 36 inches, it is obvious that the second punch must not become operative until the plate has advanced 36 inches from the point where it was when the first hole mentioned was punched. To accomplish this the perforated templet must be so made that the second punch will only operate after the plate has moved 36 inches after the action of the first punch.

I will now describe the embodiment of my invention illustrated in the accompanying drawings.

Figure 2:
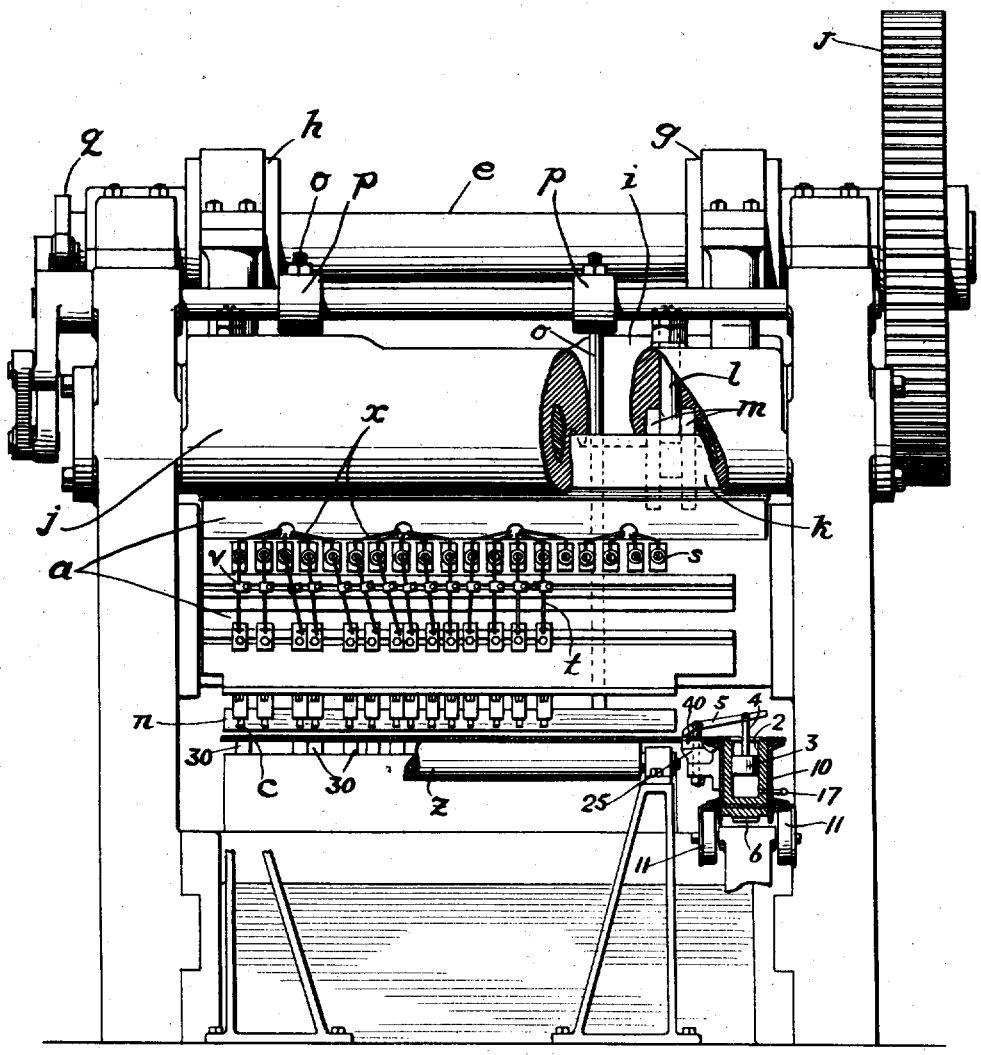
Figure 3:
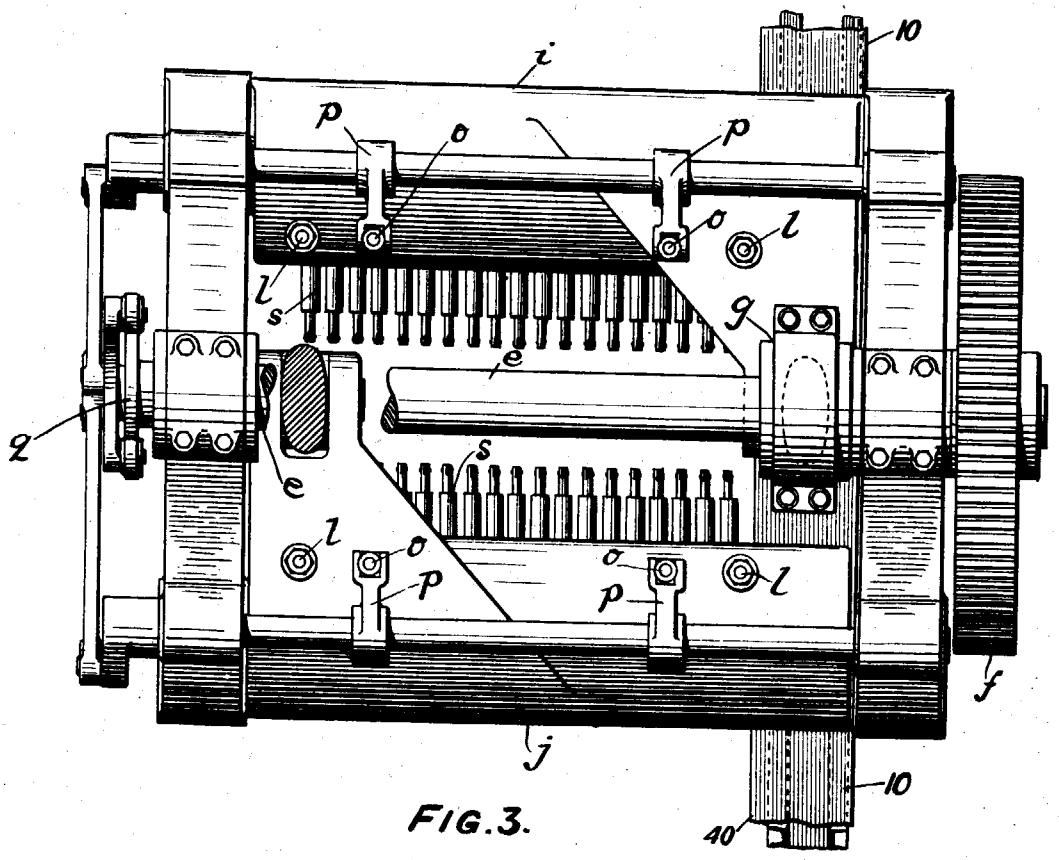
Figure 5:
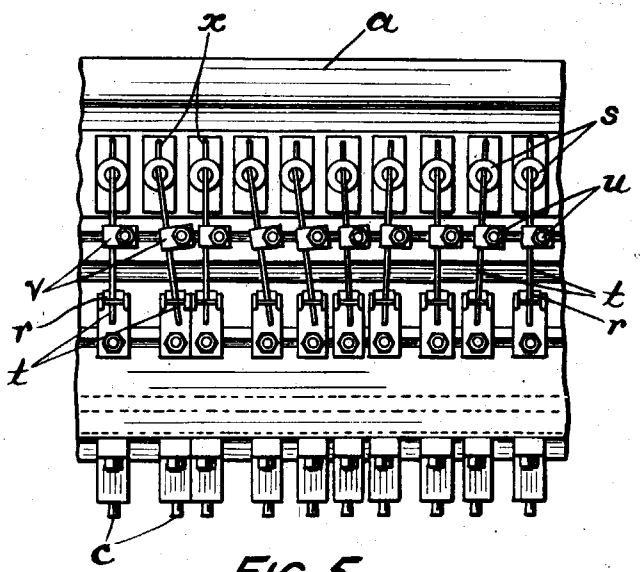
Figure 4:
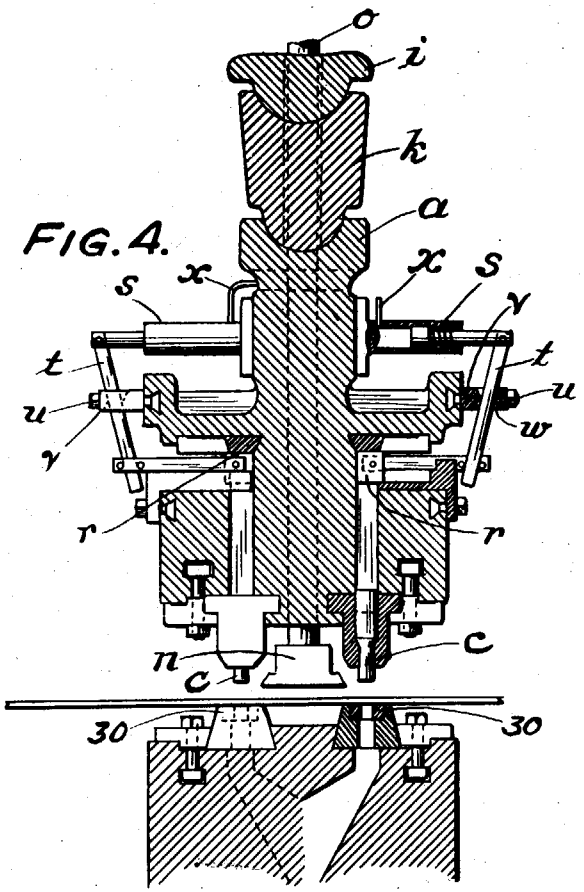
Figure 8:
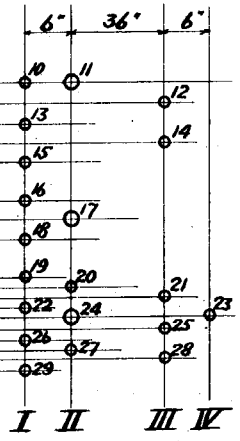
Figure 6:
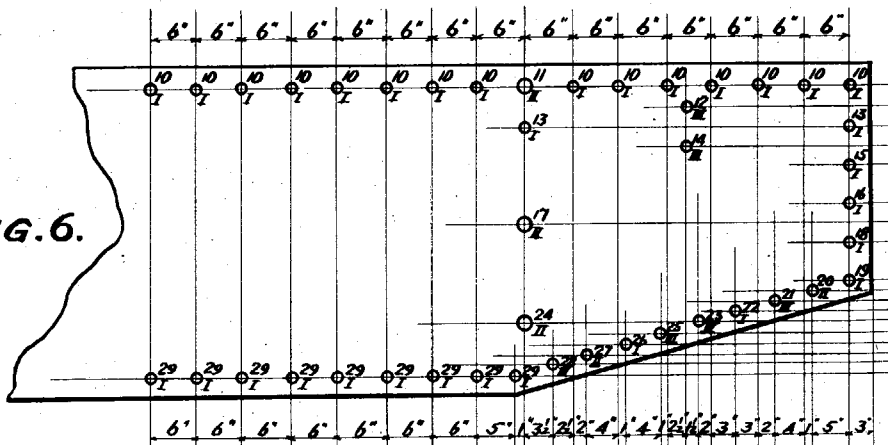
Figure 7:
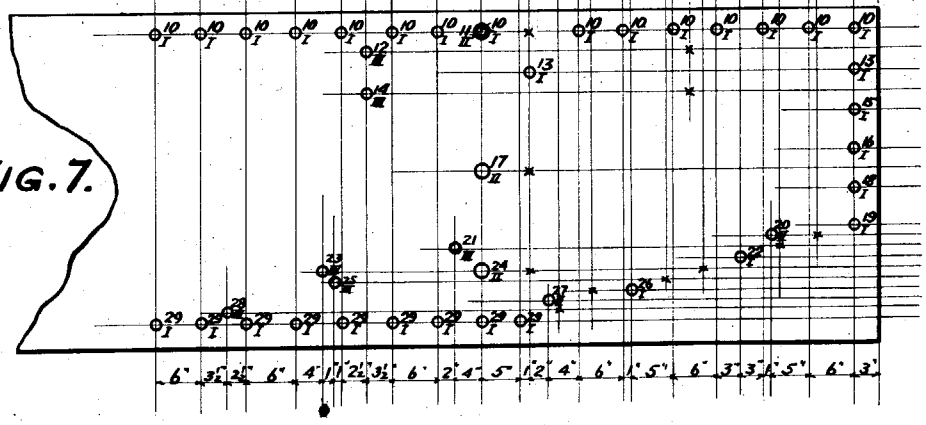

Figure 1 is a side view of the machine, partially broken away. Fig. 2 is a front view of the machine partially broken away. Fig. 3 is a plan view of the machine. Fig. 4 is an enlarged sectional view of a punch bar. Fig. 5 is a front view of a portion of the bar shown in Fig. 4. Fig. 6 shows a drawing with the punch indications in the position the corresponding punch holes will appear on the plate. This drawing may represent an actual drawing, the lay out or the indications on the plate to be punched itself. Fig. 7 shows a drawing in which the punch indications of Fig. 6 are arranged with respect to the distance between the rows of punches from which they are to be cut. Fig. 8 is a diagram showing the relative position of the punch row or punch bar and the punch indications of each bar or row.

In the drawings, I have shown two punch bars *a* and *b*. The punch bar *a* carries the rows of punches *c*, and the punch bar *b* the rows of punches *d*.

*e* is the driving shaft driven by the gear *f*. On this shaft *e* are the eccentrics *g* and *h*. The eccentric *g* operates the lever *i*, and the eccentric *h* the lever *j*. The punch bar *a* is operated by the lever *i*, and the punch bar *b* operated by the lever *j*. The lever *i*, resting on the intermediate bar *k*, which bears on the punch bar *a*, is the connection for moving the bar *a* down. The connection to lift the punch bar *a* is through the bolt *l*, which rests on the top of the lever *i*, and has the links *m* which pass through the bar *k* and are secured to the punch bar *a*. The punch bar *b* is lifted and depressed by similar means, which are similarly lettered.

Intermediate of the rows of punches on punch bars *a* and *b* are the stripping members *n* connected to the rods *o* which in turn are connected to the levers *p* operated by cam *q* on the shaft *e*. This cam is set so that the stripping member moves downward ahead of the punch bar and clamps the work at the point of punching and retains the work clamped until after the punch bars are lifted sufficiently to relieve the punch from the plate.

*r* are the gag blocks, for rendering active the punches.

*s* are the cylinders for operating the gag blocks and *t* are levers connecting the gag blocks and the pistons of these cylinders. These levers and their mountings are novel with this invention. They are so constructed that the gag blocks may be out of vertical alinement with the pistons or air cylinders which are fixed, and yet the device be operated. Generally speaking this is accomplished by mounting the levers so that they have a free movement in two directions. Specifically the construction is as follows: Corresponding to each lever is a bolt *u* on which is pivotally mounted a rectangular bearing block *v* which has the bearing points *w*. Through this bearing passes the lever *t*, which rests against these bearing points *w*, so that the block *v* can be moved on the bolt *u* into proper position and clamped securely by the said bolt. The lever *t* can then operate on the bearing points *w* as a fulcrum or axis. The position of the lever may thus, as desired, be made to conform to any adjustment of the punch with reference to its cylinder. Connecting the cylinders *s* with the air boxes (not shown) are the connecting tubes *x*, and the admission of air or the closure of air from these pipes, and thus the control of the operativeness of the punches individually, is accomplished by means of a perforated sheet, all as fully described and illustrated in my Patent No. 833,811.

*y* are rollers in advance of the punches, and *z* rollers beyond the punches.

30 are the coacting punch dies.

10 is a movable stock carrier or member mounted on rollers 11 having integral therewith at several points the cylinders 2, carrying the pistons 3, each piston is connected by a rod 4 with a clamping lever 5, which clamping lever is, when the piston is lifted, adapted to clamp the stock carrier and plate together between the clamping lever 5 and the abutment 25. This moving member or stock carrier 10 has upon it the rack 6, which is operated by the gear 7. The operation of this gear 7 may be by the same means as is used to operate the gears of the stock carrier described and illustrated in my Patent No. 833,811.

Air is admitted to the cylinders 2 by means of a flexible connection 17. This flexible connection is connected with a source of air under pressure and an exhaust orifice. The moving member or stock carrier 10 has the offset portion 40 forming a longitudinal straight edge, thus forming a gage line for setting the plate in its proper transverse position. It also gives the operator a base from which to measure in locating the punches in the various rows.

In the illustrations shown in Figs. 6, 7, and 8, I have taken it that two punch bars separated by a distance of forty-two inches and two rows of punches on each bar separated by a distance of six inches are used. The Roman figures designate the row carrying the punch, corresponding to the indications, while the Arabic designation indicates the punch corresponding to the indication independent of what bar it may be on.

In the drawing, Fig. 7, all the indications II of Fig. 6, are moved back a distance equal to the distance between the first and second row of punches *i. e.* a distance representing six inches. All the indications III of Fig. 6 are moved back a distance represented by a distance between the first and second row of punches six inches, and the distance between inside row of punches of the two punch bars *i. e.* thirty-six inches, aggregating forty-two inches. The indications IV of Fig. 6 are moved back the distance represented by the last mentioned distance and a distance represented by the distance, six inches, between the two rows of punches on the second punch bar, aggregating forty-eight inches. Thus in the drawing of Fig. 7 the punch hole indications occupy the proper relative position with respect to each other, taking into consideration the distance between the rows of punches and punch bars. From this latter drawing, the perforated templet operating the pneumatic control of the gag blocks, may readily be formed in the ordinary manner. That is, the cutter in the first section of perforated templet merely presses the keys corresponding to the numbers of the punches appearing on the first transverse line of Fig. 7, and also the keys corresponding to the spacing cutters for the distance between the first and second rows of Fig. 7. On the next section of the templet the same method is carried out by the cutter pressing the keys corresponding to the numbers of the punches appearing on the second transverse line of Fig. 7 and also the keys corresponding to the spacing cutters for the distance between the second and third transverse lines of Fig. 7. This is precisely the method used with the single row of punches or single punch bar.

In Fig. 8 the rows of punches are designated I, II, III and IV, rows I and II being on the same punch bar and rows III and IV being on the same punch bar as each other, but on a different punch bar from rows I and II. The distances between rows of punches and punch bars are also indicated. In the drawings and description I have treated the relative positions of the indications of Fig. 7 as based on the first row of punches. This row becomes the key row for the relative positions of the indications. I can use any other row of punches for the key row.

The drawing Fig. 6 is practically the lay out and may be a drawing *per se* or any other form of indication of the lay out, for instance, the plate itself.

I do not claim herein the matter illustrated in Figs. 6, 7 and 8, as the same forms the subject matter of a separate application filed by me.

Having now fully described my invention, what I claim and desire to protect by Letters Patent is—

1. In a multiple punching machine, in combination, a plurality of punch bars, each extending transversely to the path of the stock carrier across the punching machine, and located one behind the other longitudinally to the path of the stock carrier, punches in alinement with each other on each punch bar, each punch being independently adjusted along its punch bar, means to simultaneously reciprocate said punch bars, and means to independently and automatically control the operation of each punch.

2. In a multiple punching machine in combination, a plurality of punch bars, each extending transversely to the path of the stock carrier across the punching machine, and located one behind the other longitudinally to the path of the stock carrier, punches in linear alinement with each other on each punch bar, each punch being independently adjusted along its punch bar, means to simultaneously reciprocate said punch bars, and means to independently and automatically control the operation of each punch.

3. In a multiple punching machine, in combination, a plurality of punch bars each extending transversely to the path of the stock carrier across the punching machine, and located one behind the other longitudinally to the path of the stock carrier, a plurality of rows of punches for each punch bar, the punches of each row being in alinement with each other and the successive rows being located one behind the other, each punch being independently adjusted along its punch bar, means to simultaneously reciprocate said punch bars, and means to independently and automatically control the operation of each punch.

4. In a multiple punching machine, in combination, a plurality of punch bars each extending transversely to the path of the stock carrier, across the punching machine, and located one behind the other longitudinally to the path of the stock carrier, a plurality of rows of punches for each punch bar, the punches of each row being in alinement with each other and the successive rows being located one behind the other, each punch being independently adjustable transversely of the machine, means to simultaneously reciprocate said punch bars, and means to independently and automatically control the operation of each punch.

5. In a multiple punching machine, in combination, a plurality of rows of punches, each row extending transversely to the path of the stock carrier across the punching machine, and successive rows located one behind the other longitudinally to the path of the stock carrier, each punch being independently adjustable transversely of the machine, means to simultaneously reciprocate said rows of punches, and means to independently and automatically control the operation of each punch.

6. In a multiple punching machine, in combination, a plurality of rows of punches, a gag block for each punch, a fixed cylinder and its operating piston for each gag block, a lever connecting the piston and gag block, a pivoted bearing block through which said lever passes, and bearing upon which said lever is adjustably carried by said bearing block.

7. In a multiple punching machine, in combination, an adjustable punch, a gag block for said punch, a fixed cylinder and its operative piston, and a lever connecting said piston and said gag block, a pivoted bearing block through which said lever passes, and a bearing upon which said lever is adjustably carried by said gag block.

8. In a multiple punching machine, in combination, a transversely adjustable punch and its gag block, a fixed cylinder and its piston, and means to connect said piston and gag block and maintain connection in the adjusted position of the punch.

9. In a multiple punching machine, in combination, an adjustable punch, and its gag block, a fixed cylinder and its piston, a lever connecting said piston and gag block, and means to adjust said lever to the varying position of the punch and its gag block.

10. In a multiple punching machine, in combination, a number of punches adjustable relatively to each other, a gag block for each punch, fixed cylinders and their pistons one for each gag block, and means connecting each piston with its respective gag block and adapted to maintain connection in the adjusted position of the corresponding punch.

11. In a multiple punching machine, the combination with the punches and their coacting dies, of a movable member beyond the line of said punches, cylinders and their pistons carried by said movable member, a clamping device connected with each of said pistons adapted, when the piston is moved, to connect the plate to be punched with the movable member.

12. In a multiple punching machine, the combination with the punches and their coacting dies, of a movable member, cylinders and their pistons carried by said movable member, a clamping device connected with each of said pistons adapted, when the piston is moved, to connect the plate to be punched with the movable member.

13. In a multiple punching machine, in combination, a plurality of rows of punches, a stripping member between each punch of one row and the adjacent punch of a contiguous row of pairs of rows of punches, means to reciprocate the punches, means to reciprocate the stripping member in one direction before and the other direction after the movement of the punches, and means to independently control the operation of each punch.

14. In a multiple punching machine, in combination, a plurality of rows of punches, a stripping member between contiguous rows of punches, means to reciprocate the punches, means to reciprocate the stripping member in one direction before and in the other direction after the movement of the punches, and means to independently control the operation of each punch.

In testimony of which invention I have hereunto set my hand, at Philadelphia, Pennsylvania, on this 2nd day of March, 1912.

LARS H. VOLD.

Witnesses:
COLEMAN SELLERS, Jr.,
ROWL. G. TEX.

Copies of this patent may be obtained for five cents each, by addressing the "Commissioner of Patents, Washington, D. C."